(12) United States Patent
Sato et al.

(10) Patent No.: US 7,042,704 B2
(45) Date of Patent: May 9, 2006

(54) HIGH-VOLTAGE CAPACITOR, HIGH-VOLTAGE CAPACITOR DEVICE AND MAGNETRON

(75) Inventors: Tsukasa Sato, Tokyo (JP); Isao Fujiwara, Tokyo (JP); Ryo Kudo, Tokyo (JP); Hisashi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 81 days.

(21) Appl. No.: 11/036,050

(22) Filed: Jan. 18, 2005

(65) Prior Publication Data

US 2005/0168912 A1    Aug. 4, 2005

(30) Foreign Application Priority Data

Jan. 30, 2004  (JP) ............................. 2004-024108

(51) Int. Cl.
*H01G 4/35* (2006.01)
(52) U.S. Cl. .................. 361/302; 361/303; 361/305; 361/328; 361/330
(58) Field of Classification Search ................ 361/302, 361/301.2, 303, 305, 328, 330, 309
See application file for complete search history.

(56) References Cited

U.S. PATENT DOCUMENTS 5,142,436 A * 8/1992 Lee et al. ................... 361/302
5,455,405 A * 10/1995 Jun ............................. 219/761
5,729,425 A * 3/1998 Fujiwara et al. ............ 361/305
6,288,886 B1 * 9/2001 Sato et al. ................... 361/302
6,344,962 B1 * 2/2002 Asada et al. ................ 361/302

FOREIGN PATENT DOCUMENTS

| JP | 4-40524 | 4/1992 |
| JP | 5-33519 | 4/1993 |
| JP | 8-316099 | 11/1996 |

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

The present invention is directed to a high-voltage capacitor, high-voltage capacitor device and magnetron in which, undesirable radiation waves generated in the frequency range of 450 MHz to 1000 MHz in a magnetron are suppressed to such a level that there is no adverse effect on the peripheral devices. The dielectric porcelain comprises a body 210 and through holes 211, 212. The body 210 includes a portion (216, 217) that is narrowed on both sides in the middle of the body in the plan view. The through holes 211, 212 are formed in the body, arranged at a distance from each other over the narrowed portion (216, 217). One individual electrode 213 is provided on the surface of the body 210 at which the through hole 211 opens. The other individual electrode 214 is provided on the surface of the body 210 at which the through hole 212 opens. The common electrode 215 is provided on another surface of the body 210 at which the through holes 211, 212 open.

5 Claims, 6 Drawing Sheets

HIGH-VOLTAGE CAPACITOR, HIGH-VOLTAGE CAPACITOR DEVICE AND MAGNETRON

TECHNICAL FIELD

The present invention relates to a high-voltage capacitor, a high-voltage capacitor device and a magnetron having a filter constituted of the high-voltage capacitor device.

BACKGROUND OF THE INVENTION 1992-40524U (Prior Art 1) and 1996-316099A (Prior Art 2) disclose a high-voltage capacitor in which two through holes are formed at a distance in a single dielectric porcelain body, and separate individual electrodes and a common electrode which is common to the individual electrodes are formed on the surfaces of the porcelain body at which the through holes open.

1993-033519U (Prior Art 3) discloses a high-voltage capacitor comprising two separate dielectric porcelain body in place of a single dielectric porcelain body.

In the high-voltage capacitor device fabricated from the above-described high-voltage capacitor, the common electrode of the high-voltage capacitor is secured on the raised portion of a grounding metal by a means such as soldering. Through conductors are provided so as to pass through the through holes at the capacitor and a through hole of the grounding metal. The through conductors are soldered to the individual electrodes at the capacitor using electrode connectors or the like. An insulating case is fitted around the external circumference of the raised portion of the grounding metal so as to enclose the capacitor. An insulating cover is fitted at the other surface of the grounding metal so as to enclose the through conductors. The insulating cover is mounted so that it comes in complete contact with the internal circumferential surface of the raised portion of the grounding metal.

To oscillate the magnetron of a microwave oven, a voltage of about 4 kV$_{0-p}$ at a commercial frequency or at a frequency of 29 kHz to 40 kHz is applied. The magnetron thus oscillated generates undesirable radiation waves. The undesirable radiation waves have adverse effect (noise interference) on the peripheral devices. The high-voltage capacitor device is employed as a filter in the magnetron in order to eliminate the adverse effect of the undesirable radiation waves.

In the high-voltage capacitor device of Prior Art 1 or 2 employed as a filter of a magnetron, the undesirable radiation waves in the vicinities of 500 MHz, 700 MHz and 900 MHz generated in the magnetron cannot be eliminated, and have adverse effect on the peripheral devices.

In the high-voltage capacitor device of Prior Art 3 employed as a filter of a magnetron, the undesirable radiation waves in the vicinity of 900 MHz generated in the magnetron cannot be eliminated, and have adverse effect on the peripheral devices.

SUMMARY OF THE INVENTION

It is an object of the present invention to provide a high-voltage capacitor, high-voltage capacitor device and magnetron in which undesirable radiation waves in the frequency range of 450 MHz to 1000 MHz generated in a magnetron are suppressed to such a level that there is no adverse effect on peripheral devices.

In order to achieve the object described above, the high voltage capacitor according to the present invention comprises a dielectric porcelain, two individual electrodes and a common electrode. The dielectric porcelain comprises a body and two through holes. The body includes a portion that is narrowed on both sides in the middle of the body in the plan view. The two through holes are provided in the body, arranged at a distance from each other over the narrowed portion. The two individual electrodes are provided on one surface of the body at which the two through holes open. The common electrode is provided on another surface of the body at which the two through holes open.

In a preferred embodiment of the high-voltage capacitor according to the present invention, the minimum width of the narrowed portion is in the range of 2.5 mm to 4.1 mm.

The high-voltage capacitor according to the present invention composes the high-voltage capacitor device in combination with a grounding metal, a through conductor and the like. Namely, the high-voltage capacitor according to the present invention comprises at least one grounding metal, at least one high-voltage capacitor of claim 1 and at least one through conductor. The grounding metal has a raised portion provided with a through hole. The common electrode of the high-voltage capacitor is secured on the raised portion of the grounding metal so as to achieve electrical continuity with the grounding metal. The through conductor passes through the grounding metal and the high-voltage capacitor and is connected with the individual electrode so as to achieve electrical continuity.

In the magnetron according to the present invention, the above-described high-voltage capacitor device is employed as a filter. In the high-voltage capacitor device, the through conductor is used as a power supply terminal and the capacitor is connected between the through terminal and the grounding metal. Accordingly, the undesirable radiation waves traveling through the through conductor can be absorbed through the filtering function of the high-voltage capacitor device.

In the high-voltage capacitor device of the present invention, the dielectric porcelain body includes a portion that is narrowed on both sides in the middle of the body in the plan view. According to this structure, the undesirable radiation waves in the frequency range of 450 MHz to 1000 MHz can be suppressed to 30 dB or less in noise level. The reason is considered that the narrowed portion in the middle of the body in the plan view provides a suitable capacity characteristics for eliminating the noise components in the above-mentioned frequency range. Consequently, the undesirable radiation waves generated in a magnetron can be eliminated, or suppressed to such a level that there is no adverse effect on peripheral devices.

Other objects, structural features and advantages of the present invention are explained in further detail by referring to the attached drawings. The attached drawings simply present illustrations of embodiments.

DESCRIPTION OF THE PREFERRED EMBODIMENTS

Figure 1:
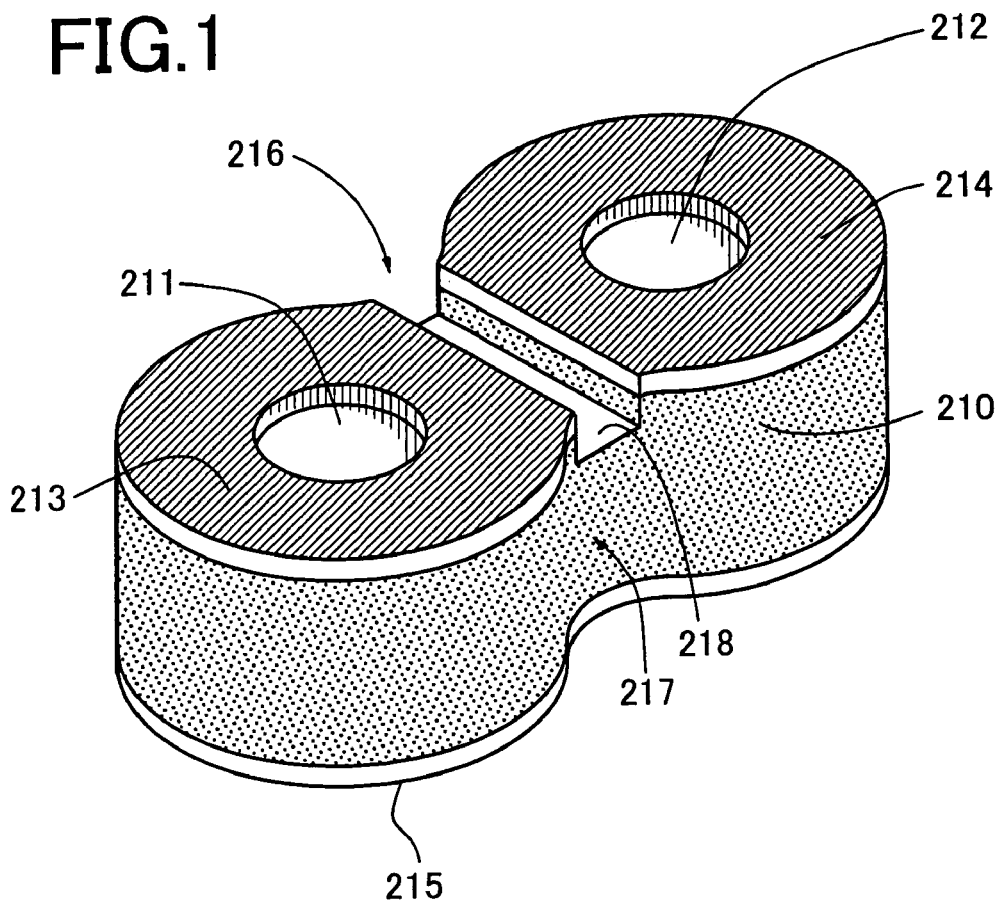
FIG. 1 is a perspective view of an example of the high-voltage capacitor according to the present invention.
Figure 2:
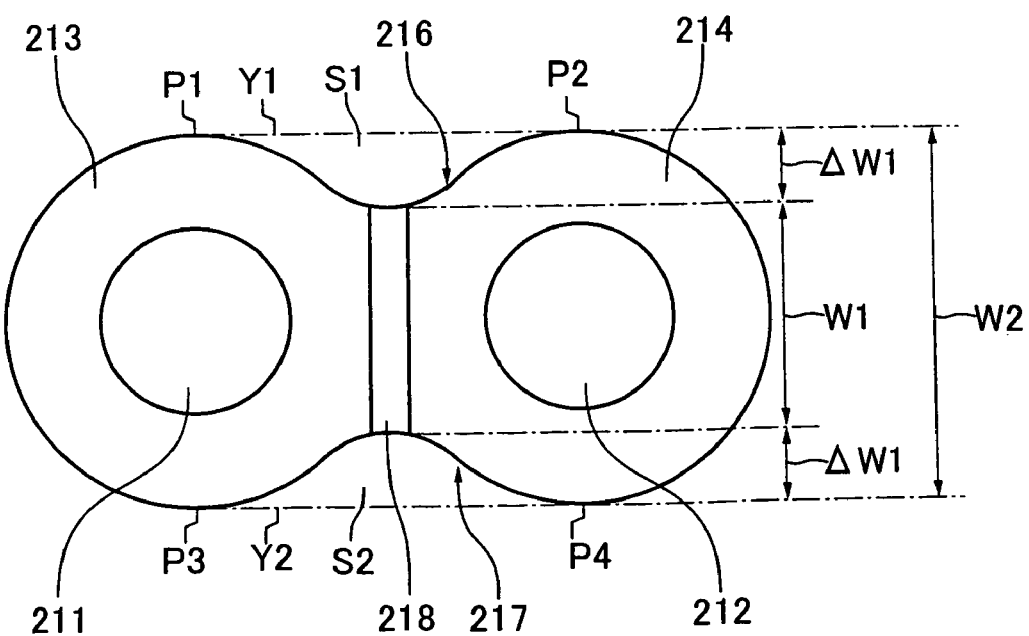
FIG. 2 is a plan view of the high-voltage capacitor shown in FIG. 1.

FIG. 1 is a perspective view of an example of the high-voltage capacitor according to the present invention, and FIG. 2 is a plan view of the high-voltage capacitor shown in FIG. 1. The high-voltage capacitor illustrated comprises a dielectric porcelain 210, two individual electrodes 213, 214 and a common electrode 215.

The dielectric porcelain 210 comprises the body 210 and two through holes 211, 212. The dielectric porcelain and the body are labeled the same reference numeral, for convenience sake for illustration. The body 210 may have a well-known composition in which $BaTiO_3$—$BaZrO_3$—$CaTiO_3$ is a main constituent with one or more additives. The body 210 has a gourd shape (sandglass shape) including a portion (216, 217) that is narrowed on both sides in the middle of the body in the plan view. The minimum width W1 of the narrowed portion (216, 217) is in the range of 2.5 mm to 4.1 mm. In the middle of the narrowed portion (216, 217), there is formed a groove 218.

With reference to FIG. 2, one recess 216 of the narrowed portion has an area S1 defined by the tangent line Y1 (which is tangent to the two arcs on both sides of the recess 216), the two tangent points P1, P2 and the outer circumferential surface of the body 210. Similarly, the other recess 217 of the narrowed portion has an area S2 defined by the tangent line Y2 (which is tangent to the two arcs on both sides of the recess 217), the two tangent points P3, P4 and the outer circumferential surface of the body 210. The minimum width W1 is reduced by ΔW1 on each side, in relation to the width W2 from the line Y1 to the line Y2. It is preferable that the two recesses 216, 217 are symmetrical with the middle line of the high-voltage capacitor.

The two through holes 211, 212 are formed in the body 210, arranged at a distance from each other over the narrowed portion (216, 217). Each of the through holes 211, 212 opens at the opposing surfaces of the body 210. On the surfaces where the through holes 211, 212 open, there are formed electrodes 213 to 215. More specifically, the individual electrode 213 is formed on the surface at which the through hole 211 opens and the individual electrode 214 is formed on the surface at which the through hole 212 opens. The common electrode 215 is formed on the other surface at which the through holes 211 and 212 open. The individual electrodes 213, 214 and the common electrode 215 may be constituted of Ag as a main constituent, preferably.

Figure 3:
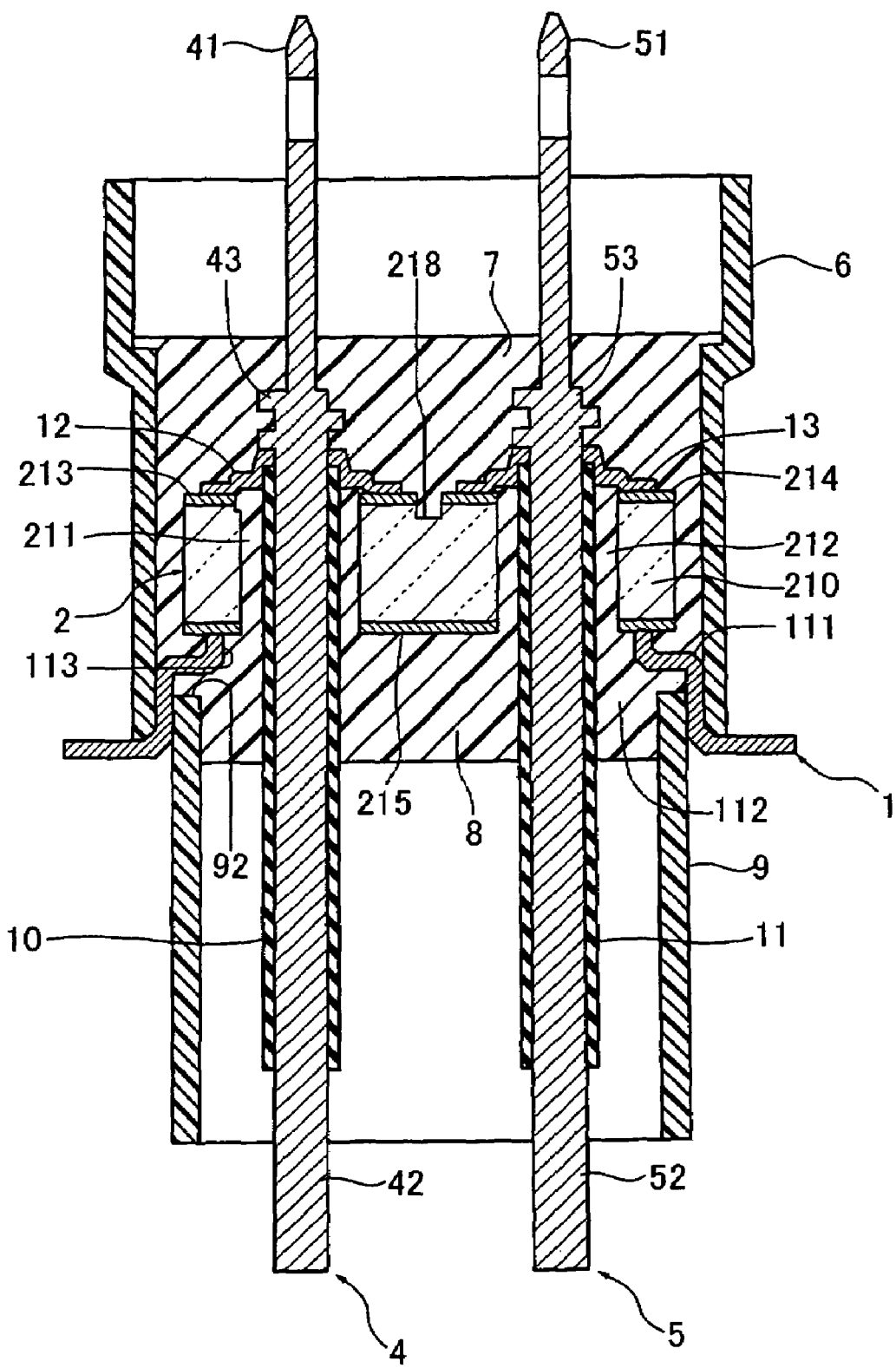
FIG. 3 is a frontal cross section of an example of the high-voltage capacitor device according to the present invention.
Figure 4:
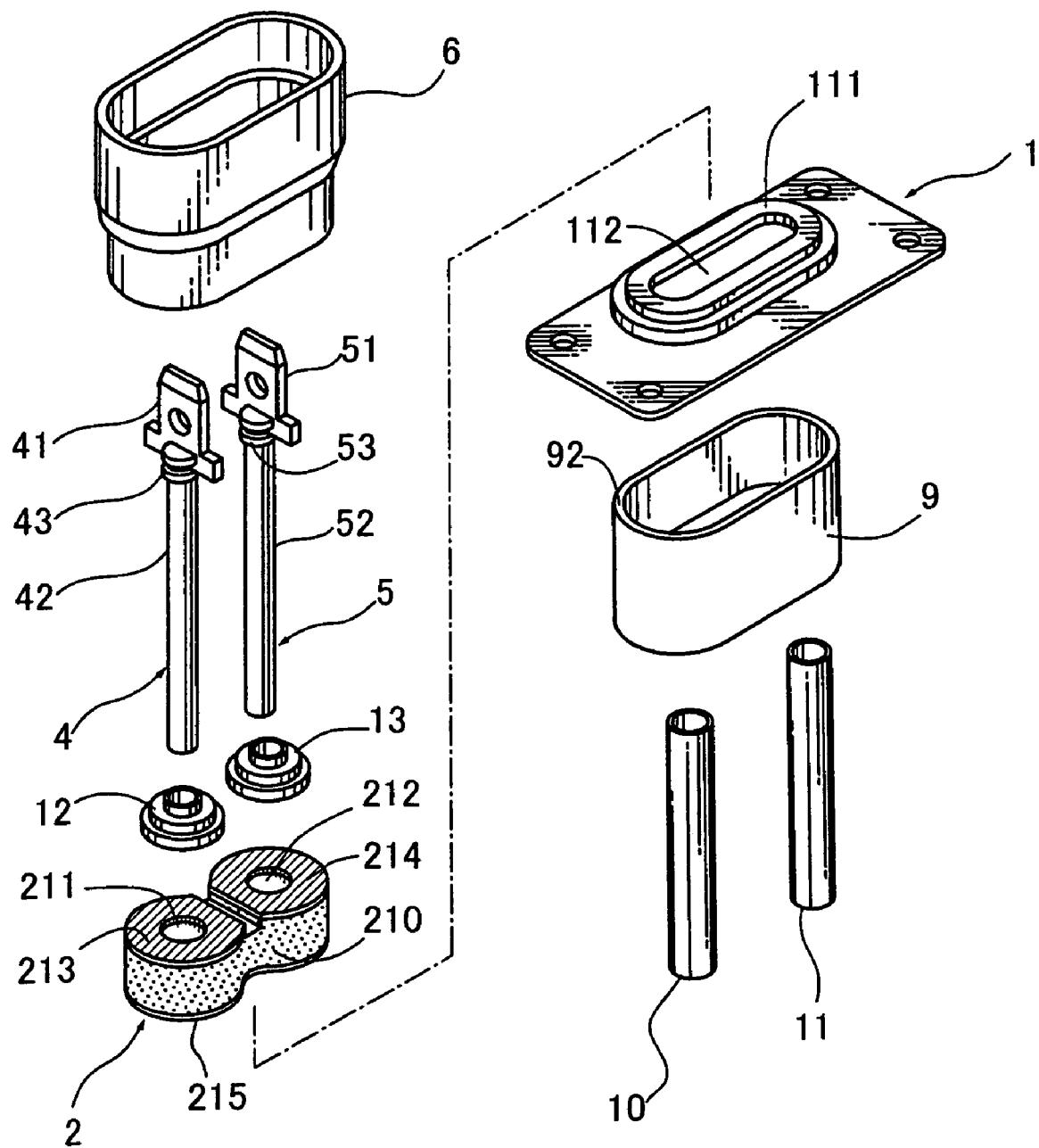
FIG. 4 is an exploded perspective view of the high-voltage capacitor device shown in FIG. 3.

FIG. 3 is a frontal cross section of an example of the high-voltage capacitor device according to the present invention, and FIG. 4 is an exploded perspective view of the high-voltage capacitor device shown in FIG. 3. In the figures, the same reference numerals are provided for the components corresponding to those shown in FIG. 1 and FIG. 2. The high-voltage capacitor device illustrated comprises a grounding metal 1, a high-voltage capacitor 2, through conductors 4 and 5, an insulating case 6, insulating resin portions 7 and 8, an insulating cover 9 and insulating tubes 10 and 11.

The grounding metal 1 has a raised portion 111 on one surface thereof, with the raised portion 111 having a through hole 112 passing through from the one surface to the other surface.

The high-voltage capacitor 2, which has been described with reference to FIG. 1 and FIG. 2, is provided on the raised portion 111 of the grounding metal 1, with the common electrode 215 is fixed on the raised portion 111 by a means such as soldering.

The through conductors 4 and 5 pass through electrode connectors 12 and 13, the through holes 211 and 212 of the high-voltage capacitor 2 and the through hole 112 of the grounding metal 1, and are secured on the electrode connectors 12, 13 by a means such as soldering and connected with the individual electrodes 213, 214 so as to achieve electrical continuity by the electrode connectors 12 and 13. Specifically, one through conductor 4 passes through the through hole 211 and the through hole 112, and is secured on the electrode connector 12 by a means such as soldering and connected with the individual electrode 213 so as to achieve electrical continuity. Similarly, the other through conductor 5 passes through the through hole 212 and the through hole 112, and is secured on the electrode connector 13 by a means such as soldering and connected with the individual electrode 214 so as to achieve electrical continuity.

In the illustrated embodiment, one through conductors 4 has a penetration portion 42 which passes through the high-voltage capacitor 2, and a tab portion 41 which is used as a tab connector. The penetration portion 42 and the tab portion 41 are connected by swaging 43. Similarly, the other through conductor 5 has a penetration portion 52 and a tab portion 51 which are connected by swaging 53.

The insulating tubes 10, 11 cover the portions of the through conductors 4, 5 respectively located inside the through holes 211 and 212. The insulating tubes 10, 11 are constituted of silicon or the like.

The insulating case 6 is provided on the one surface of the grounding metal 1. One end of the insulating case 6 is fitted around the external circumference of the raised portion 111. The insulating case 6 may be constituted of a polybutylene terephthalate (PBT), a polyethylene terephthalate, a modified melamine or the like.

The insulating cover 9 is provided on the other surface of the grounding metal 1. One end of the insulating cover 9 is inserted in the internal circumference of the raised portion 111. The insulating cover 9 may be constituted of a polybutylene terephthalate (PBT), a polyethylene terephthalate, a modified melamine or the like.

The insulating resin portions 7 and 8 fill the space inside the insulating case 6 and the space inside the insulating cover 9 and also fill the space around the high-voltage capacitor 2. To explain this in further detail, the insulating resin portion 7 fills the space outside the capacitor 2 toward the one surface of the grounding metal 1 and is in complete contact with the surface of the dielectric porcelain 210. The insulating resin portion 8 fills the space inside the raised portion 111 of the grounding metal 1 and fills the through holes 211 and 212 at the capacitor 2, and is in complete contact with the surface of the dielectric porcelain 210. The insulating resin portions 7, 8 may be constituted of a thermo-setting resin such as urethane resin or an epoxy resin. Alternatively, they may be constituted of a phenol resin, a silicon resin or the like.

Figure 5:
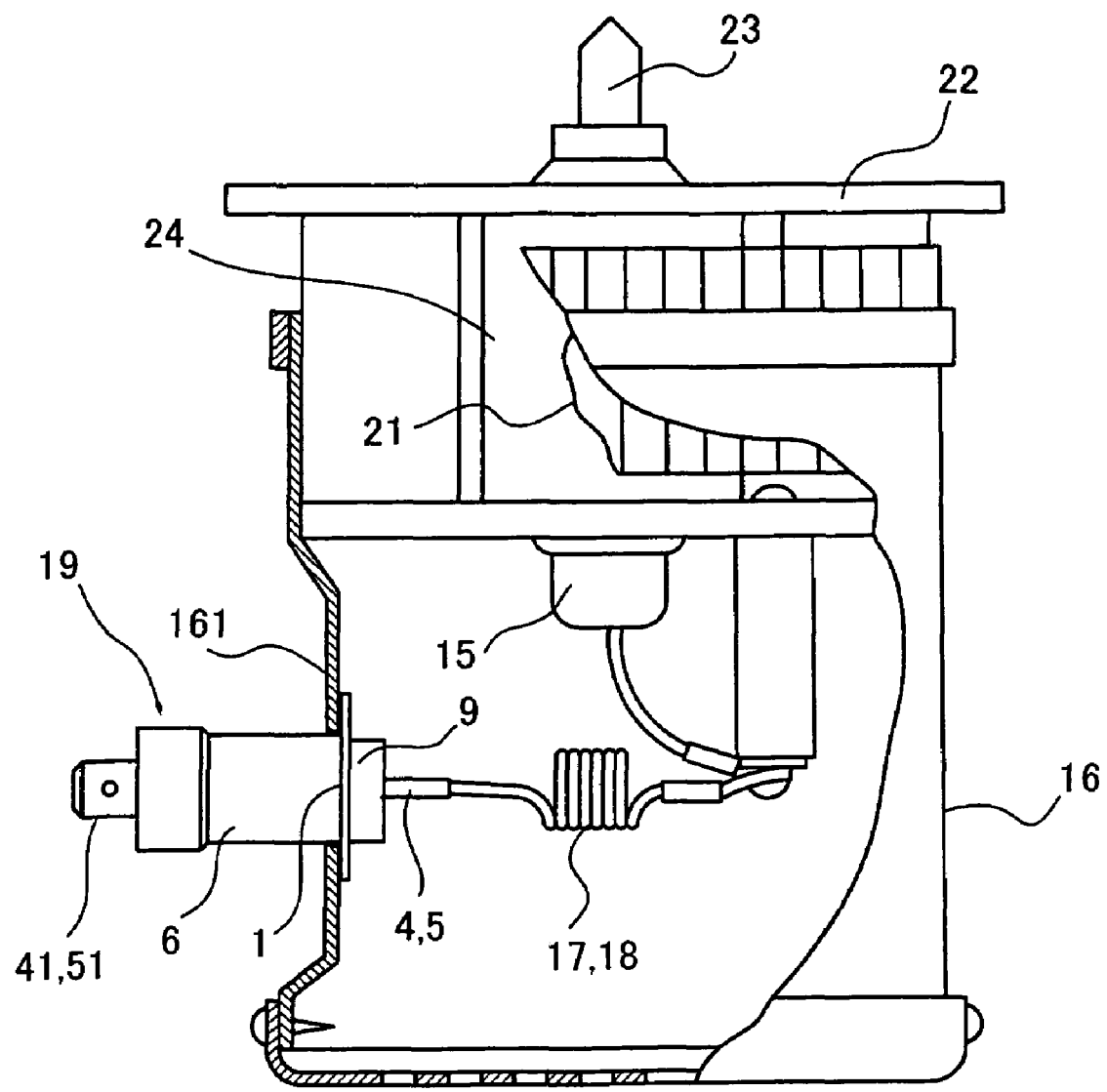
FIG. 5 is a partial cut-away section of a magnetron having a filter comprising the high-voltage capacitor device according to the present invention.

FIG. 5 is a partial cut-away section of a magnetron having a filter comprising the high-voltage capacitor device according to the present invention. In the figure, reference numeral 15 indicates a cathode stem, reference numeral 16 indicates a filter box, reference numerals 17 and 18 each indicate an inductor and reference numeral 19 indicates the high-voltage capacitor device according to the present invention utilized in conjunction with the inductors 17 and 18 to constitute a filter. The filter box 16 encloses the cathode stem 15, and the high-voltage capacitor 19 is provided so as to allow the insulating resin 7 to be exposed outside through a through hole formed at a side plate 161 of the filter box 16 with its grounding metal 1 securely attached to the side plate 161 of the filter box 16. The inductors 17 and 18 are connected in series between the cathode terminal of the cathode stem 15 and the through conductors 4 and 5 of the high-voltage capacitor 19 inside the filter box 16. Reference numeral 21 indicates cooling fins, reference numeral 22 indicates a gasket, reference numeral 23 indicates an RF output end and reference numeral 24 indicates a magnet.

Figure 6:
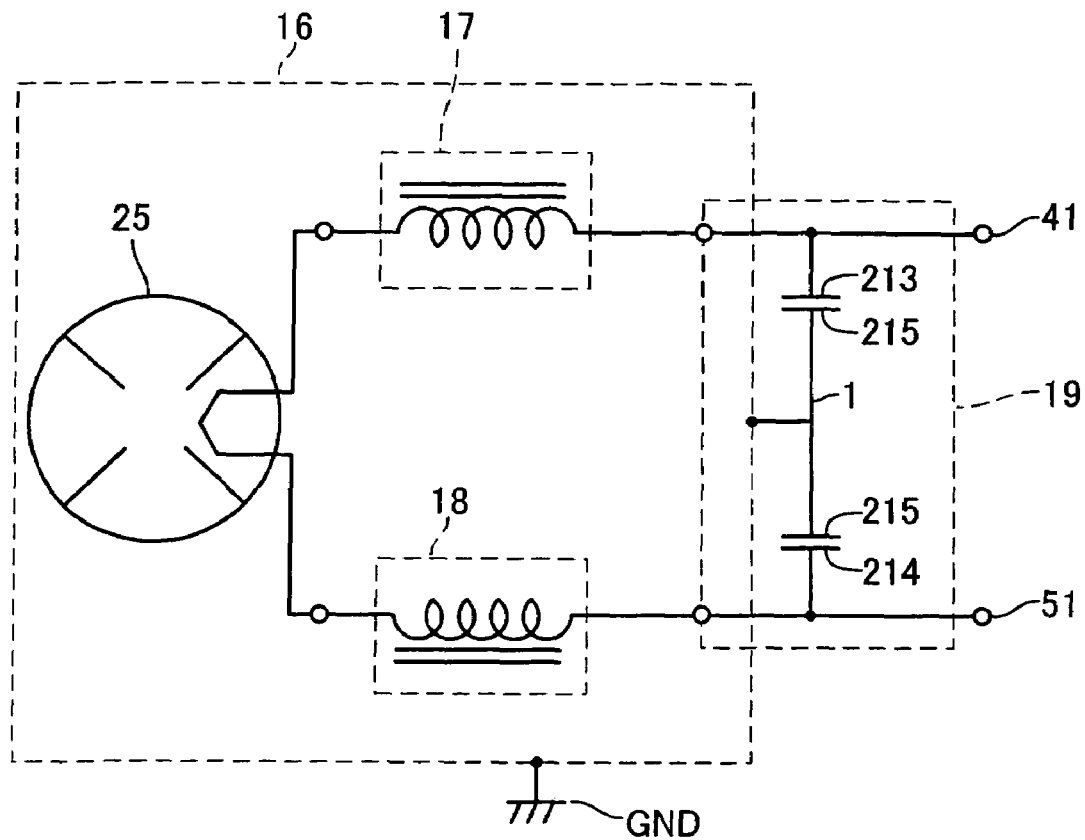
FIG. 6 is an electric circuit diagram of the magnetron shown in FIG. 5.

FIG. 6 is an electric circuit diagram of the magnetron shown in FIG. 5. In the figure, the same reference numerals are provided for components corresponding to those represented in the preceding drawings. The reference numeral 25 indicates an oscillator and GND indicates a grounding electrode.

A voltage of about 4 $kV_{0-p}$ at a commercial frequency or at a frequency of 20 kHz to 40 kHz is supplied to the through conductors 4 and 5 of the high-voltage capacitor 19, in order to oscillate the magnetron in the microwave oven. The high voltage thus supplied is then supplied to the magnetron from the through conductors 4 and 5 via the inductors 17 and 18, and the magnetron is oscillated. As describe above, the oscillation generates undesirable radiation waves, which make noises. The noises (undesirable radiation waves) traveling through the through conductors 4 and 5 are absorbed through the filtering function achieved by the high-voltage capacitor device 19 and the inductors 17 and 18.

The grounding metal 1 is grounded and high voltage is applied to the through conductors 4 and 5. Since the grounding metal 1 is provided with at least one through hole 112 and the high-voltage capacitor 2 is provided with at least one through hole 211 or 212 passing through the dielectric porcelain 210, the through conductors 4 and 5 with higher potential relative to the ground potential are installed between the grounding metal 1 at the ground potential and the common electrode 215 of the high-voltage capacitor 2 while ensuring good electrical insulation with the through holes 211 and 212.

In the illustrated high-voltage capacitor device, since the insulating resin portions 7 and 8 fill the space around the capacitor 2, the reliability measured in reliability tests such as high-temperature load tests and moisture resistance load tests or the reliability of the capacitor when it is operated in a hot and humid environment is improved.

Furthermore, the insulating resin 8 fills the spaces inside the grounding metal 1, the insulating cover 9 and the dielectric porcelain 210. Accordingly, a solid structure of bonding the grounding metal 1 and the insulating cover 9 with the insulating resin 8 is obtained, and remarkable improvement in the adhesive force between the grounding metal 1 and the insulating cover 9 is obtained. This suppresses shrinking of the insulating resin 8 in diameter direction and prevents a gap between the grounding metal 1 and the insulating cover 9.

The present invention is characterized in that the dielectric porcelain body 210 of the capacitor 2 includes the narrowed portion (216, 217) in the middle of the body. According to the above-described narrowed shape, undesirable radiation waves in the frequency range of 450 MHz to 1000 MHz generated in a magnetron can be suppressed to 30 dB or less in noise level. The minimum width W1 of the narrowed portion (216, 217) is preferably in the range of 2.5 mm to 4.1 mm, as described above.

Now, relation between the minimum width of the narrowed portion, and crack occurrence, electric capacitance and dielectric loss in high-voltage capacitor devices is explained hereafter with experimental data.

Figure 7:
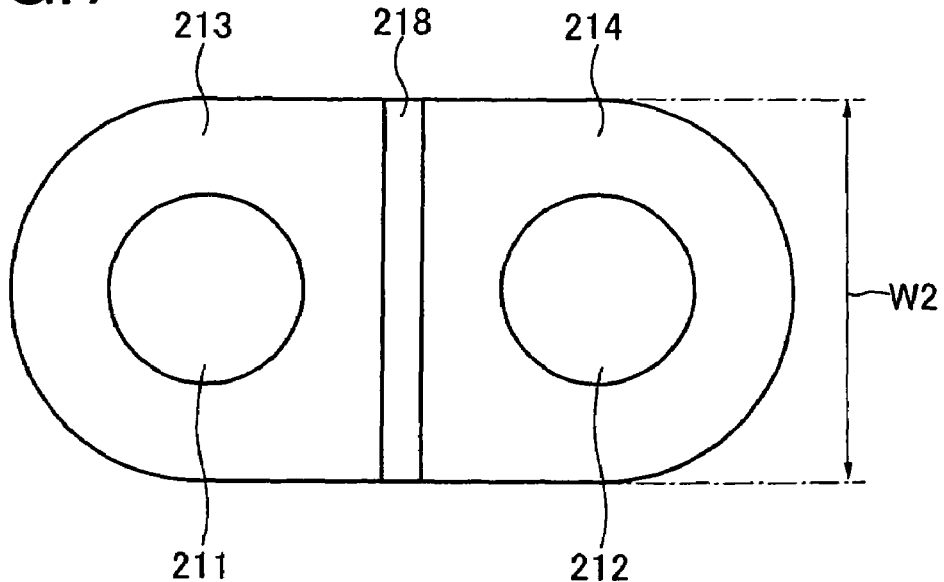
FIG. 7 is a plan view of a prior art high-voltage capacitor.

Table 1 shows experimental data including crack occurrence, electric capacitance and dielectric loss by every width with respect to the minimum width of the narrowed portion. In Comparison Examples 1 to 6 and Examples 1 to 4, the minimum width of the narrowed portion (216, 217) are set in the range of 8.0 mm to 0.0 mm in the high-voltage capacitor device structure shown in FIG. 4. However, Comparison Example 1 is the prior art high-voltage capacitor device shown in FIG. 7 and a minimum width of 8.0 mm means that there is no narrowed portion in the dielectric porcelain body. In Comparison Example 6, a minimum width of 0.0 mm means that the high-voltage capacitor device is composed of two separate dielectric porcelain bodies.

In Table 1, "Electric capacitance C1" and "Dielectric loss tan δ1" are the values measured between the individual electrode 213 and the common electrode 215. "Electric capacitance C2" and "Dielectric loss tan δ2" are the values measured between the individual electrode 214 and the common electrode 215. "Crack occurrence in assembly process" indicates whether there is crack occurrence or not in the assembly process in which the high-voltage capacitor device shown in FIG. 3 and FIG. 4 is assembled.

TABLE 1

Electric capacitance, dielectric loss; and crack occurrence in assembly process by every minimum width of narrowed portion

|  | Minimum width (mm) | Crack occurrence in assembly process | Electric capacitance C1 (pF) | Dielectric loss tan δ 1 (%) | Electric capacitance C2 (pF) | Dielectric loss tan δ 2 (%) |
|---|---|---|---|---|---|---|
| Comparison Example 1 | 8.0 | NO | 383 | 0.3 | 385 | 0.3 |
| Comparison Example 2 | 5.7 | NO | 353 | 0.4 | 343 | 0.4 |
| Embodiment 1 | 4.1 | NO | 308 | 0.3 | 305 | 0.4 |
| Embodiment 2 | 3.6 | NO | 300 | 0.4 | 297 | 0.4 |
| Embodiment 3 | 3.0 | NO | 270 | 0.4 | 282 | 0.4 |
| Embodiment 4 | 2.5 | NO | 276 | 0.4 | 270 | 0.4 |
| Comparison Example 3 | 1.8 | NO | 244 | 0.4 | 256 | 0.4 |
| Comparison Example 4 | 1.5 | YES | N/A | N/A | N/A | N/A |
| Comparison Example 5 | 1.2 | YES | N/A | N/A | N/A | N/A |
| Comparison Example 6 | 0.0 | NO | 207 | 0.4 | 206 | 0.4 |

Referring to Table 1, in Comparison Examples 4 and 5, which are 1.5 mm and 1.2 mm in minimum width of the narrowed portion of the high-voltage capacitor, there is crack occurrence in the assembly process. Consequently, the high-voltage capacitor of 1.2 mm to 1.5 mm in minimum width is not suitable for preventing crack occurrence.

In contrast, in Embodiments 1 to 4, which are in the range of 2.5 mm to 4.1 mm in minimum width, there is no crack occurrence in the assembly process.

In Comparison Examples 1 to 3 and 6, which are out of the range of 2.5 mm to 4.1 mm in minimum width, there is no crack occurrence in the assembly process. However, in the Comparison Examples 1 to 3 and 6, noise interference with peripheral devices arises. This point is explained hereafter with experimental data.

Table 2 shows experimental data including noise interference level characteristics in the magnetrons. The magnetrons are composed of the high-voltage capacitor devices of Embodiments 1 to 4 and Comparison Examples 1 to 3 and 6 which, in Table 1, have no crack occurrence in the assembly process. The noise measurement method is as follows.

First, the microwave oven was set at 45 degrees in position and the antenna was set at 1 m in height. Next, 1 liter of water, which acts as a load, was put in a Petri dish. Then, the microwave oven was operated for 10 minutes in advance. After that, noise measurement was done 4 times for a measurement time (8 minutes). The above noise measurement was done twice in the horizontal direction and twice in the vertical direction in relation to the antenna.

TABLE 2

Noise level by every frequency range and by every minimum width of narrowed portion

| | | 451 to 550 MHz | | 651 to 750 MHz | | 851 to 1000 MHz | |
|---|---|---|---|---|---|---|---|
| | Minimum width (mm) | Frequency (MHz) | Noise level (dB) | Frequency (MHz) | Noise level (dB) | Frequency (MHz) | Noise level (dB) |
| Comparison Example 1 | 8.0 | 527 | 29.3 | 702 | 31.7 | 878 | 37.0 |
| Comparison Example 2 | 5.7 | 524 | 29.3 | 717 | 28.9 | 890 | 30.1 |
| Embodiment 1 | 4.1 | 518 | 28.7 | 717 | 25.5 | 878 | 29.2 |
| Embodiment 2 | 3.6 | 524 | 27.1 | 718 | 24.7 | 878 | 28.6 |
| Embodiment 3 | 3.0 | 531 | 25.4 | 717 | 25.5 | 878 | 28.6 |
| Embodiment 4 | 2.5 | 492 | 23.6 | 717 | 25.4 | 878 | 29.8 |
| Comparison Example 3 | 1.8 | 492 | 22.7 | 716 | 25.7 | 878 | 31.8 |
| Comparison Example 6 | 0.0 | 521 | 22.1 | 716 | 26.9 | 877 | 32.4 |

Referring to Table 2, in Comparison Example 1, which is 8.0 mm in minimum width of the narrowed portion of the high-voltage capacitor, the noise level of the undesirable radiation wave generated in the magnetron is lower than 30 dB in the frequency range of 451 MHz to 550 MHz, but it is over 30 dB in the frequency range of 651 to 750 MHz and the frequency range of 851 to 1000 MHz.

In Comparison Example 2, which is 5.7 mm in minimum width of the narrowed portion, the noise level of the undesirable radiation wave generated in the magnetron is lower than 30 dB in the frequency range of 451 MHz to 550 MHz and the frequency range of 651 MHz to 750 MHz, but it is over 30 dB in the frequency range of 851 MHz to 1000 MHz.

In Comparison Example 3, which is 1.8 mm in minimum width of the narrowed portion, the noise level of the undesirable radiation wave generated in the magnetron is lower than 30 dB in the frequency range of 451 MHz to 550 MHz and the frequency range of 651 MHz to 750 MHz, but it is over 30 dB in the frequency range of 851 MHz to 1000 MHz.

In Comparison Example 6, which is 0.0 mm in minimum width of the narrowed portion, the noise level of the undesirable radiation wave generated in the magnetron is lower than 30 dB in the frequency range of 451 MHz to 550 MHz and the frequency range of 651 MHz to 750 MHz, but it is over 30 dB in the frequency range of 851 MHz to 1000 MHz.

Consequently, in Comparison Examples 1 to 3 and 6, which are 8.0 mm, 5.7 mm, 1.8 mm and 0.0 mm in minimum width of the narrowed portion of the high-voltage capacitor, the undesirable radiation waves in the frequency range of 450 MHz to 1000 MHz cannot be suppressed to 30 dB or less, and there are adverse effects on peripheral devices.

In contrast, in Embodiments 1 to 4, which are 4.1 to 2.5 mm in minimum width of the narrowed portion, the noise level of the undesirable radiation waves generated in the magnetron is greatly lower than 30 dB in the frequency range of 451 MHz to 550 MHz, the frequency range of 651 to 750 MHz and the frequency range of 851 to 1000 MHz.

As described with reference to Table 1 and Table 2, when the minimum width of the narrowed portion of the high-voltage capacitor is in the range of 2.5 to 4.1 mm, cracking can be prevented and the undesirable radiation waves in the frequency range of 450 MHz to 1000 MHz generated in the magnetron can be suppressed to 30 dB or less.

Figure 8:
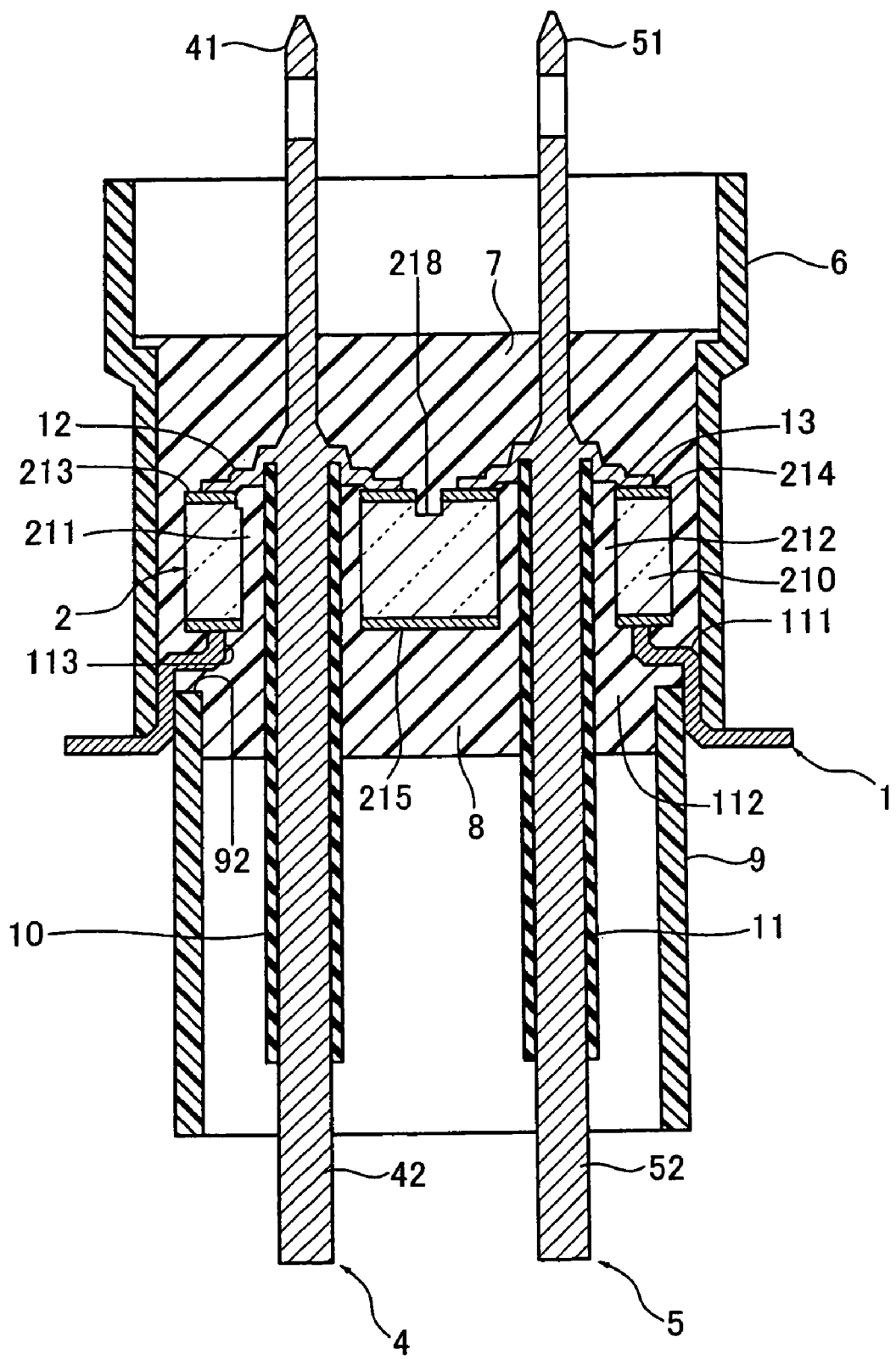
FIG. 8 is a frontal cross section of another example of the high-voltage capacitor device according to the present invention.

FIG. 8 is a frontal cross section of another example of the high-voltage capacitor device according to the present invention. In FIG. 8, the same reference numerals are provided for the components corresponding to those shown in FIG. 1 to FIG. 4 and duplication of explanation is omitted.

In comparison with the high-voltage capacitor device shown in FIG. 3 and FIG. 4, the high-voltage capacitor device shown in FIG. 8 is characterized in that the electrode connector 12 (13) is formed as an integrated part of the through conductor 4 (5). Also in this embodiment, the dielectric porcelain body 210 of the high-voltage capacitor 2 includes a portion narrowed on both side in the middle of the body. Accordingly, in the high-voltage capacitor device employed as a filter of a magnetron, the undesirable radiation waves in the frequency range of 450 MHz to 1000 MHz generated in the magnetron can be suppressed to 30 dB or less.

While the present invention has been described in detail with reference to the preferable embodiments, it will be understood by those skilled in the art that various modified modes may be made therein without departing from the principal and teaching of the invention.

What is claimed is:

1. A high-voltage capacitor comprising a dielectric porcelain, two individual electrodes and a common electrode, wherein:
    said dielectric porcelain comprises;
        a body including a portion that is narrowed on both sides in the middle of said body in the plan view; and
        two through holes provided in said body, arranged at a distance from each other over said narrowed portion;
    said two individual electrodes are provided on one surface of said body at which said two through holes open; and
    said common electrode is provided on another surface of said body at which said two through holes open.

2. The high-voltage capacitor of claim 1, wherein:
    said body has a composition in which $BaTiO_3$—$BaZrO_3$—$CaTiO_3$ is a main constituent with one or more additives.

3. The high-voltage capacitor of claim 1, wherein:
    the minimum width of said narrowed portion is in the range of 2.5 mm to 4.1 mm.

4. A high-voltage capacitor device comprising:
    at least one grounding metal having a raised portion provided with a through hole;

at least one high-voltage capacitor of claim 1, with said common electrode secured on said raised portion of said grounding metal so as to achieve electrical continuity with said grounding metal; and at least one through conductor passing through said grounding metal and said high-voltage capacitor and connected with said individual electrode so as to achieve electrical continuity.

5. A magnetron having a filter comprising the high-voltage capacitor device of claim 4.

* * * * *